Inventors
ROLAND RAMMLER
PAUL SCHMALFELD
BY
ATTORNEYS.

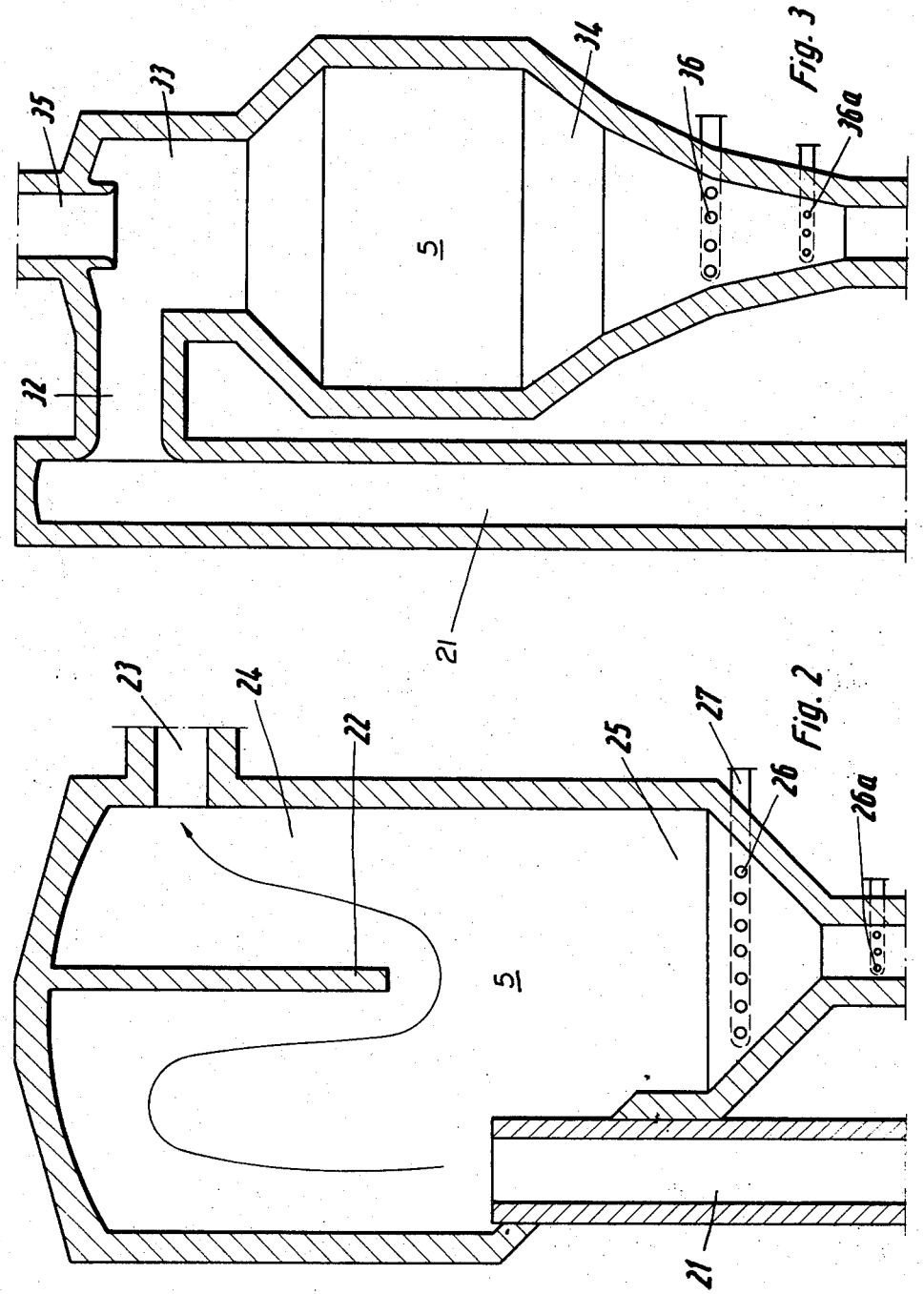

United States Patent Office 3,703,442
Patented Nov. 21, 1972

1

3,703,442
METHOD FOR THE LOW-TEMPERATURE DISTILLATION OF FINELY GRANULAR BITUMINOUS MATERIALS WHICH FORM A PULVERULENT RESIDUE IN THE PROCESS
Roland Rammler, Frankfurt, and Paul Schmalfeld, Bad Homburg, Germany, assignors to Metallgesellschaft Aktiengesellschaft
Filed Feb. 18, 1970, Ser. No. 12,327
Claims priority, application Germany, Feb. 25, 1969, P 19 09 263.8
Int. Cl. C10b 49/18
U.S. Cl. 201—12
10 Claims

ABSTRACT OF THE DISCLOSURE

In a process for low temperature distillation of finely granular bituminous or petroliferous raw materials forming a pulverulent residue during the pyrolysis which comprises:
 (a) circulating a heat carrier between a distillation zone and a heating zone;
 (b) introducing the raw material into the distillation zone and heating it therein for said distillation with the heat carrier, and for formation therefrom of distillation gases and said pulverulent residue;
 (c) withdrawing distillation gases from the distillation zone;
 (d) withdrawing the heat carrier and pulverulent distillation residue in admixture from the distillation zone;
 (e) pneumatically conveying said admixture through the heating zone with a propellant gas and reheating the heat carrier therein; and
 (f) returning the heated carrier to the distillation zone; the improvement which comprises
 (g) separating the effluent of the heating zone, comprising said heated carrier, pulverulent distillation residue and propellant gas, into propellant gas and a mixture of heated carrier particles and pulverulent distillation residue, and
 (h) sifting pulverulent distillation residue from said mixture of heated carrier and pulverulent material to provide the heated carrier returned to the distillation zone in step (f).
Apparatus for practice of the process is also disclosed.

BACKGROUND

The invention relates to a method and an apparatus for the low-temperature distillation of finely granular bituminous or oily materials which during the pyrolysis form a pulverulent residue, the said method and apparatus making use of circulating finely granular heat carriers which are heated in a pneumatic conveyor and are then mixed with the starting material. It is in the prior art to heat finely granular fuels, such as coal, oil shale or the like, for low-temperature distillation (below 700° C., preferably between 500 and 650° C.) by mixing them with hot lumpy or finely granular heat carriers.

It is also in the prior art to heat finely granular fuels for low-temperature distillation and gas removal by mixing them with heat carriers of coarser size, such as metal or ceramic balls.

In both cases the particle size of the heat carrier is such that it can be separated from the degassification residue by sifting, so that it can be reheated and recirculated back to the distillation zone.

Great differences between the grain sizes of the heat carriers and the material being distilled make thorough mixing and uniform heat transfer difficult.

When the coarse, spherical heat carriers known as "pebbles" are used, their circulation through the distillation zone and the heating zone requires a considerable investment in apparatus.

It is in the prior art in the low-temperature distillation of finely granular fuels by means of heat carriers to use the distillation residue as the heat carrier by circulating a portion of the residue through the distillation zone and the heating zone. The heating is performed in that case by partial combustion in an air stream in a conveyor, thereby simultaneously providing for transport within the circuit.

In a process of this sort which has already proven practical on a large technical scale, the vertical heating and transporting means empties into a hopper in which the hot heat carriers separate from the transporting gas and gather on the bottom, while the transporting gas leaves through the top of the hopper, carrying with it the fines formed by attrition and disintegration. Hot, sifted heat carriers are fed from the hopper to the distillation zone which is usually underneath it.

This procedure, however, is usable only as long as the distillation residue is in finely granular form and its finely granular nature and its grain size distribution does not change substantially while it is being circulated as a heat carrier. This process becomes impractical when the material to be distilled forms during its pyrolysis a floury, dusty residue. Such materials occur in many localities, and are found especially among oil shale and oil chalks.

Oil shales of various origins behave quite differently in the distillation. Some oil shales form a relatively solid residue, which does not change substantially in its grain size composition during the process. Other oil shales, however, distintegrate substantially in the distillation process and leave a floury dust as the residue. Colorado oil shale represents an example of this latter kind of shale.

In the case of oil chalk and oil sand, the grain size of the distillation residue depends directly on the grain size of the material in whose interstices the oil is deposited. A finely granular oil bearing material also leaves a fine powder residue.

The known low-temperature distillation processes are poorly suited for the exploitation of those bituminous minerals which leave a pulverulent distillation residue. Processes entailing indirect heating of a stationary layer of the material in a chamber over are impractical on account of the poor heat conductivity and the high initial investment that is required. Processes involving direct heating of the material with hot recirculated gases cannot be used because they develop an uncontrollable amount of dust. Even the most desirable method of putting heat into the distillation process by means of finely granular heat carriers still requires great improvements and modifications in the distillation process in order to be applicable to a raw material that leaves a pulverulent residue.

THE INVENTION

It has now been found that the low-temperature distillation process that operates on the basis of finely granular heat carriers can also be applied to a starting material that leaves a pulverulent distillation residue if, according to the invention, a finely granular solid foreign substance is used as the heat carrier, which is of sufficiently stable shape to withstand repeated circulation through the heating and distillation without substantial grain distintegration, and which is heavy and large enough to permit the pneumatic separation of the pulverulent residue.

The pulverulent distillation residue, according to the invention, does not participate in the circulation of the heat carrier, but is separated from the latter pneumatically before the heat carrier returns to the distillation zone. This is done particularly for the purpose of keeping harmful amounts of dust out of the distillation zone. Besides, considerable amounts of dust are entrained by the flowing distillation gases and vapors from the residue that forms in the distillation. The feedback of dust as a heat carrier would greatly increase these amounts of dust and would only add to the difficulty of recovering a low-dust distillate. The separation of the heat carrier from the distillation residue is therefore to be as complete as possible so that little or no dust will be fed back to the distillation zone with the heat carrier.

As a rule, the distillation residue still contains combustible substances, which are advatageously burned up wholly or partially in the process so as to serve for the heating of the distillation plant. Therefore it is important to perform the sifting so that the separation of the heat carriers and the distillation residue will be performed in the heat carrier circuit at the temperatures prevailing therein, which are within the range of the distillation temperature that is to be used.

According to the invention, the distillation residue, sifted from the mixture it formed with the heat carrier, leaves the separating chamber together with hot exhaust gas. Ordinarily, it is the entire amount of the residue that has formed in the process. The invention provides for cooling the dust together with the exhaust gas and only then separating it from the exhaust gas.

In order to recover a low-dust distillate from bituminous minerals which form a pulverulent distillation residue, it is important not only to limit the development of dust in the distillation zone, but also to separate the flying dust from the gases and vapors leaving the distillation, to the greatest possible extent, before the commencement of the condensation of the oil vapors. The remaining dust is separated in the first, hottest recovery or condensation stage together with the high-boiling oil components which are the first to be condensed. The dust-rich condensate from this first stage can be fed back to the distillation process immediately or after suitable preparation. Completely dust-free oil fractions are won, from the final condensation stages.

The subject of the invention is a method of low-temperature distillation of bituminous or petroliferous materials which form a pulverulent distillation residue, by means of a finely granular heat carrier which is circulated through the low-temperature distillation zone and a heating zone, and which is heated in the heating zone in a conveyor, and, after separation from the transporting gas, is mixed with the material to be distilled.

The method of the invention is characterized by the fact that a finely granular, foreign heat carrier of stable shape is used, the distillation residue being separated by pneumatic sifting from the mixture of residue and heat carrier after the heating, and being carried away together with the hot exhaust gases (transporting and sifting gases).

Dust entrained by the distillation gases and vapors from the distillation reactor is separated ahead of the condensation system by, for example, cyclone separators, and the residual or rest of the flying dust is washed out in the first part of the condensation system.

Materials suitable for use as heat carriers are, for example, wear resistant materials such as sand or ceramic grains. The preferred grain size ranges approximately from 0.5 to 2 mm. The starting material for such a finely granular heat carrier can, however, also be an oil-poor shale which experience has shown to have less tendency to grain distintegration than an oil-rich shale. Such oil-poor shales are usually to be found as overlying strata, interbedding or underlying strata in oil-rich shale occurrences, and in the winning of same they can be included to the extent that is necessary in order to compensate the heat carrier losses.

The separation of the heat carrier and distillation residue begins when the mixture of the two passes with the transporting gas from the heating and conveying system into the separating chamber. The abrupt change in the direction of flow causes the heat carriers and portions of the distillation residue to separate from the transporting gas, the latter carrying a portion of the distillation residue out of the separating chamber. The actual sifting for the complete separation of heat carriers and distillation residue is performed by means of an additional sifting gas current introduced into the separating chamber. A cyclone separator, for example, can be used as the separating chamber.

Hot combustion gas or preheated air are advantageously used for the sifting. Sifting by means of air is to be provided especially when the distillation residue still contains combustible substances which are burned by the sifting air. This afterburning has the advantage that it continues to heat the heat carriers during the sifting process.

This reduces the heat demand on the pneumatic conveyor, which simultaneously serves for the heating of the material being conveyed, so that the conveyor can be made smaller in size. The introduction and distribution of the sifting medium in the lower part of the sifter is performed advantageously by a preferably horizontal pipe system. It may be desirable to construct the bottom portion of the sifter along with the system for the introduction and distribution of the sifting medium in the form of a grate-less fluidized bed.

If the sifting is combined with afterburning and air is used as the sifting medium, the sifted heat carrier entraps free oxygen in its interstitial volume and carries this oxygen with it into the distillation reactor, where even small quantities of oxygen can produce a partial oxidation of the distillation product, which can result in a lowering of the oil yield, an impairment of the quality of the oil, or other disadvantages. To prevent this carrying of oxygen into the distillation reactor, an inert medium, such as nitrogen or steam, can be introduced through a system of pipes into the outlet funnel of the sifter or into the upper portion of the pipe connecting the sifter and the distillation chamber, so as to displace the free oxygen from the interstitial volume. Steam is preferred as the inert medium when the distillation gas is used for the manufacture of hydrogen or of synthesis gas and therefore must be kept as free of nitrogen as possible. It is desirable to locate the system of introduction and distribution pipes at a vertical distance of at least 250 mm. below the pipe for the distribution of the sifting medium.

The pulverulent distillation residue sifted from the heat carriers is first carried together with the pneumatic transporting gases through a waste-heat recovery system, which consists for example of an air preheater and a waste-heat boiler, before it is separated in a separating apparatus. The common cooling of the transporting gas and the distillation residue results not only in a substantial increase in the amount of usable waste heat, but also in a reduction of the size of the apparatus that is to be used for the complete cooling of the distillation residue separated from the carrier gas. This final cooling can be omitted entirely in many cases. The common cooling of the pulverulent distillation residue and the transporting gases additionally offers the advantage that the apparatus that is to serve for the removal of dust from the carrier gas can be smaller and hence cheaper on account of the construction involved in the cooling.

The separation of the pulverulent residue from the cooled transporting gases can best be performed in two stages. A mechanical cyclone separator in the first stage is advantageously followed by an electrostatic separator as the second stage, especially when stringent requirements must be met as regards pollution of the atmosphere. At the same time it may be desirable to provide additional cooling following the first, mechanical removal of the bulk of the dust, by means of the injection and evaporation of water prior to the electrostatic dust removal, so as to improve resistance to electrical breakdown, and to shift the electrical resistance of the dust, which is dependent on temperature, into a more favorable range.

In the low-temperature distillation of oil shale that disintegrates greatly, it is known that, the more perfectly the organic substance is released from the shale, the greater the disintegration of the granules is. In the actual distillation, a carbon-rich remainder of organic substance always is left in the residue. This remainder is burned away in the oxidizing atmosphere of the transporting air during passage through the pneumatic conveyor, and thus is removed from the inorganic part of the distillation residue, with the result that the latter disintegrates more greatly. The sifting of the pulverulent distillation residue from the hot heat carriers prior to the return of the latter to the distillation reactor perceptibly reduces the input of dust to the reactor. Consequently, the distillation vapors and gases can be taken from the reactor with a lower dust content, and after passing through a suitable dust removal apparatus, e.g., cyclone separators, they can enter with a still lower dust content into the condensation system that follows, so that a distillation oil having a comparatively low dust content will be produced in it.

The distillation gases flowing from the distillation reactor are first cleaned in cyclone separators while they are still hot. As in every low-temperature distillation or coking process, however, it is inevitable that small amounts of dust will pass into the condensation apparatus. The distillation vapors and gases are conventionally precipitated in a fractional condensation process. If the condensation apparatus is appropriately constructed and the temperatures are properly maintained, a heavy oil fraction that is rich in dust develops in the first stage, so that fractions having a lower boiling point which are practically dust-free are produced in the following condensation stages. The dust-rich heavy oil fraction can be thermally processed (FIG. 2, infra), mechanically filtered (FIG. 1, infra), or burned as additional fuel in the pneumatic conveyor.

The thermal processing of the dust-rich heavy oil fraction consists in a redistillation with partial cracking of the heavy oil. It is performed either by returning the fraction to the distillation reactor or in a special apparatus provided for the purpose. The feedback to the reactor can be increased to such an extent that no heavy oil has to be taken out of the apparatus as a product. Increasing redistillation of heavy oil results in a diminishing oil yield, but this is compensated by an improvement of the oil quality in the sense of a lower oil density.

The creation of a separate installation for the thermal processing of the dusty heavy oil becomes desirable particularly when the distillation system is set up for very great throughputs and consists of a plurality of parallel trains of apparatus. In that case so much dust-laden heavy oil is produced that a separate plant can be operated to process it, in which the optimum conditions for this purpose, as regards temperatures, residence times, etc., can be maintained.

If it is desired to combine the redistillation of the dust-laden heavy oil with the low-temperature distillation process, it is desirable to use as the distillation reactor a double-screw mixer to which the starting material and the hot heat carrier are fed separately.

The distillation reactor then has to perform the redistillation in addition to its actual task of distilling the finely granular material. On this account it is advantageous to make the mixer larger, and especially longer, in order thus to provide for a longer time of residence of the solids in the distillation reactor. Otherwise there is a danger that the distillation of the finely granular starting material will not be completed and reduced oil yields will result. It is desirable to perform the redistillation of the returned heavy oil in the hottest part of the mixer, i.e., at a point ahead of the introduction of the finely granular raw or starting material. In a mixer of this kind, the point of entry of the heat carriers is followed, at a short distance in the direction of movement, by the inlet for the heavy oil, which is followed further on by the infeed aperture for the starting material. From the processes of movement in a mixer of this sort it can be determined that the redistillation zone is to be given a length of about 0.3 to 3.0 x D, D being the diameter of the mixing screws, the smaller factors being applicable to large mixers and the larger factors being applicable to mixers of small diameter.

The mixer can be of the type disclosed in FIGS. 2–4 of application Ser. No. 877,996, filed Nov. 19, 1969, for Retort System For Oil Shales And The Like; by Paul Schmalfeld, Hans Sommers and Heinrich Janssen, corresponding to German application P 18 09 874.3, assigned to the assignee hereof, the said Schmalfeld being one of the applicants herein. The said mixers are also disclosed in FIGS. 2–4 of said German application.

The dust that accumulates in the first heavy oil fraction can also be separated mechanically, e.g., by filtration or centrifugation or extraction in a procedure as is shown in FIG. 1, for example. On account of the relatively high viscosity of the heavy oil fraction, the mechanical dust removal is performed at elevated temperatures ranging from 100 to 350° C., preferably 150 to 250° C., or else the oil is made more fluid with a suitable thinner, such as light oil (FIG. 4, infra). In the latter case, settling can be considered as a method of dust removal.

If elevated temperatures are used and dilution is not employed, the oily filter cake or centrifugation sludge is advantageously fed back to the distillation reactor. It is desirable to mix these residues with the fresh, finely granular starting material before feeding them into the reactor.

When the heavy oil is purified with dilution, a residue results which, in addition to residues of oil in its interstitial volume, has a light-oil content corresponding to the ratio of dilution. If, for example, the purification is performed with a revolving vacuum filter on which the filter cake is washed by spraying light oil on it before it is removed, the interstitial volume of the filter cake is mainly filled with the valuable light oil. This oil must then be removed from the residue, although modern filters yield a cake that has a very low liquid content. According to the invention, the rewashed purification residue is freed of oil by mixing it in the necessary ratio with hot distillation residue just as it is produced in great quantities in the distillation process, and heating it above the boiling point of the diluent. This evaporates any light oil that may remain in the residue, and it is recovered according to the invention in a condenser. It is an idea of the invention that the mixing of the light-oil containing dust residue is performed in a mechanical mixer having two mixing shafts rotating in the same sense.

SPECIFIC EMBODIMENTS

The invention is further explained below by descriptions of three embodiments, with reference to the accompanying drawings, of which:

FIG. 2 is a vertical section through a two stage sifting separator as used in the process according to FIG. 1, embodied in the form of a so-called separator-collector hopper equipped with sparger tubes for injecting a sifting medium in the bottom portion;

FIG. 3 is a vertical section through a single stage sifting separator, embodied in the form of a cyclone separator having a grate-less fluidized bed in the bottom portion and sparger tubes for a sifting medium and a stripping gas in the bottom portion;

In the drawings, like reference characters indicate the same or corresponding parts, unless otherwise indicated.

EXAMPLE 1

Figure 1:
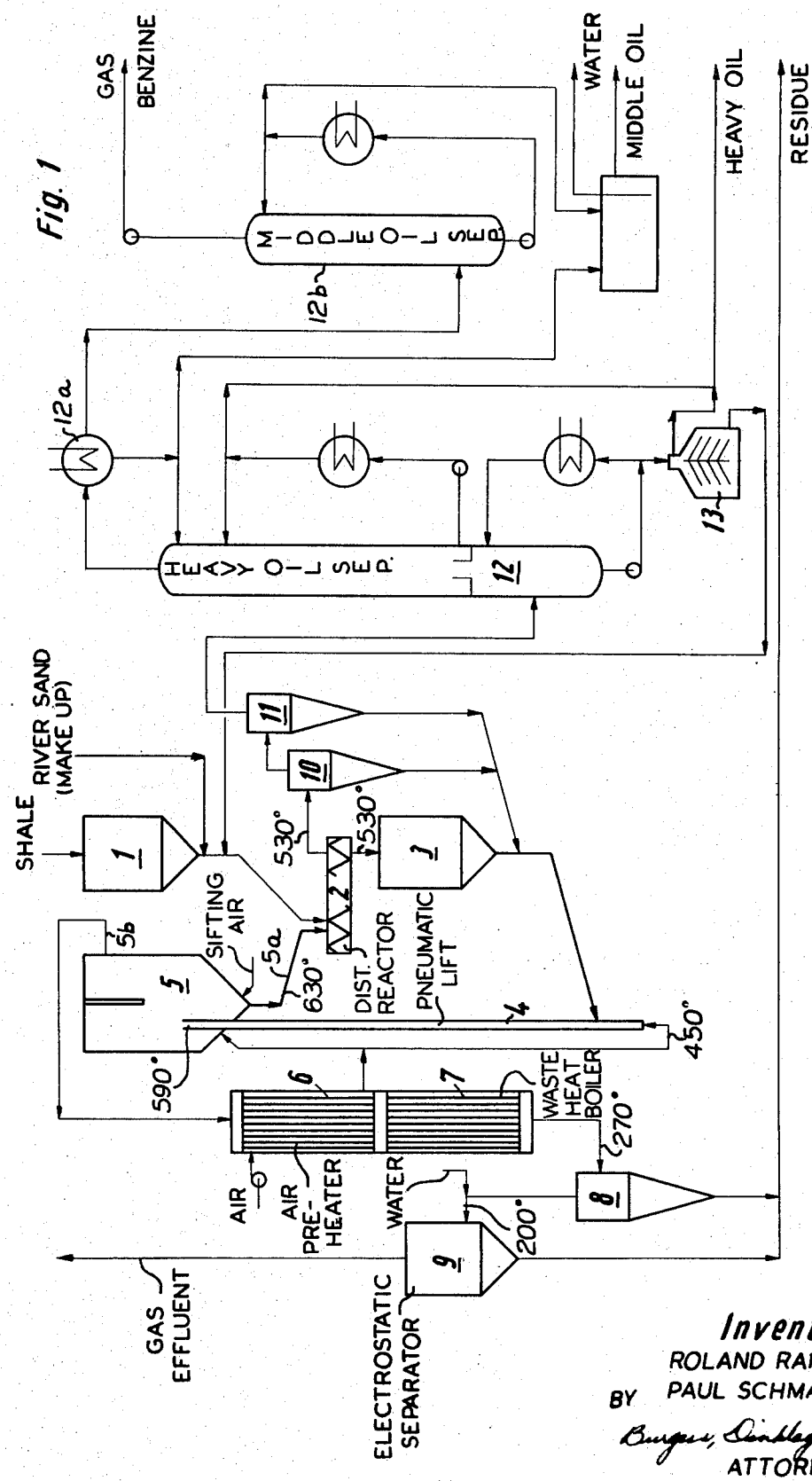
FIG. 1 is a flow diagram of the process with two-stage sifting, centrifugation of the hot heavy oil and feedback of the centrifugation residue to the distillation reactor.

In FIG. 1, 1 designates a feed hopper from which oil shale of a grain size smaller than 4 mm. is continuously fed into the distillation reactor 2 which is in the form of a mechanical mixing mechanism. Make up heat carrier river sand having a grain size smaller than 1.5 mm. is mixed continuously or periodically with the shale in a quantity of 0.8% by weight. Substantially dust-free heat carrier is fed continuously, via line 5a, at a temperature of 630° C. into the distillation reactor 2. The weight ratio of heat carrier to starting material is about 6. On account of the large surface areas of the finely granular heat carrier and of the finely granular shale starting material, and on account of the positive mixing action, a very intense heat exchange takes place in the distillation reactor, so that by the time the two components have reached the end of the mixer, both have substantially reached the equilibrium temperature of 530° C. Oil vapors and gases are thereupon released from the shale and the solid distillation residue disintegrates largely to a floury dust, a portion of which is carried out of the reactor with the distillation vapors and gases.

Most of the pulverulent distillation residue leaves the mixer together with the finely granular heat carrier and, after flowing through the after-degassing hopper 3, it passes into the lower part of the pneumatic updraft conveyor 4, into which air, preheated to 450° C., is injected from the bottom. This air drives the mixture of pulverulent distillation residue and finely granular heat carriers upward through the conveyor and causes a burning away of residues of organic substances which are left in the residue after distillation. In this manner the solids are heated while they are being conveyed upward. The feed of air to the conveyor is controlled so that the temperature of the propellant gas and of the material being propelled is 590° C. at the upper end of the conveyor. At this temperature the solids in the separator-collector hopper 5 are largely separated from the propellant gases and collected in the bottom of this hopper.

By a sufficiently high velocity of the propellant gases in the exit side of the separator-collector hopper 5 it can be brought about that the pulverulent residue will leave the separator with the propellant gas via line 5b as will be described in connection with FIG. 2. The pulverulent distillation residue that is separated with the granular heat carrier is substantially sifted out of the heat carrier deposit by the introduction and uniform distribution of preheated air in the lower portion of the hopper. At the same time the burning off of the organic residues in the distillation residue is continued, so that the temperature of the heat carriers in the sifter increases from 590 to 630° C. The finely granular heat carrier, substantially freed of the pulverulent distillation residue runs at this temperature into the distillation reactor, thus completing its circuit. On the other hand, the distillation residue does not participtate in this circuit, but leaves the separator 5 together with the propellant and sifting gases and flows with them through a waste-heat recovery system consisting of an air preheater 6 and a waste-heat boiler 7. To combat abrasion by the dust-laden gas the turns in the ductwork between the separator 5 and the air preheater 6 can be lined with wear-resistant material and the top level of the air preheated 6 can be protected by laying wear-resistant plates on it.

After cooling to 270° C., the exhaust gas is substantially freed of dust in the cyclone 8. Then it is cooled to 200° C. by the injection and evaporation of water. At this temperature it enters the electrostatic filter 9 where the final filtration is performed. The evaporation of water ahead of the electrostatic filter increases the electrical breakdown strength of the gas and at the same time reduces the electrical resistance of the dust, which is dependent upon temperature.

Although the sifted heat carrier from hopper 5 brings only a very small amount of pulverulent distillation residue into the distillation reactor 2, an appreciable amount of dust is carried out of the mixer reactor 2 by the distillation gases and vapors as a result of grain disintegration, the temperature of these gases being 530° C. This flying dust is substantially precipitated in two cyclones 10 and 11 connected in series, and is added to the material entering into the pneumatic lift conveyor 4. The dust still contained in the gas-vapor mixture after it leaves the cyclones is completely freed of dust in the lower part of the heavy oil separator 12 by circulated heavy oil, the temperature in this stage being adjusted according to the amount of dust to be removed, so that the heavy oil that is withdrawn from the bottom of the separator 12 will have the highest possible dust content without losing its ability to be pumped. Consequently the dust content of the heavy oil fraction is kept slightly below 50% by weight. The dust-laden heavy oil is cleaned in centrifugal separators 13. The dust-laden centrifugation residue is returned to the mechanical mixer 2 for redistillation. The gases and vapors then flow through additional condensation stages in which oil fractions free of dust are produced. Heavy oil is also stripped from the distillation gases in the upper part of the separator 12. The overhead distillation gas from separator 12 is treated in cooler 12a and middle oil separator 12b to separate said overhead into a middle oil fraction and a light gas fraction as is indicated in FIG. 1.

The construction of the separator and sifter at the upper end of the pneumatic lift, as chosen for use in Example 1, will be further explained with reference to FIG. 2.

Broadly considered, the separator is for separating from a gas stream entraining solid particles of relatively large size, and solid particles of relatively small size, the solid particles of relatively large size. The separator includes a separating chamber having an inlet for the gas stream, an outlet for the gas stream, and an outlet for the separated large particles. The outlet for large particles is disposed in the bottom portion of the separator. The separator further includes means for routing the gas stream through the separator chamber so that the large solid particles are thrown out of the gas stream to the bottom of the separator for discharge through the outlet for large particles. The invention provides the improvement which comprises sifter means disposed in the bottom portion of the separator chamber adjacent the outlet for large particles for introducing a sifting gas for travel upwardly through the separated large particles to sift small particles from the separated large particles.

The mixture of solids and propellant gas passes up through the lift 21 into the separating chamber on the left side of the masonry partition 22. The partition forces the gas, which is at first flowing freely upward, to perform two changes of direction in order to reach the outlet 23. In the second reversal under the partition, the solids are hurled into the lower part of the hopper. The space 24 behind the partition is dimensioned to produce higher gas velocities, preferably of more than 1 m./sec., e.g. from 2 to 4 m./sec., in it. Thereby the separator can can be made to perform a preliminary sifting in that certain amounts of pulverulent distillation residue will escape being separated from the heat carrier. This is particularly the case when the chamber 24 is omitted and the diameter of the separator is made smaller, the gas discharge aperture is placed lower down, and a baffle is placed ahead of the discharge aperture instead of the partition wall 22.

The further sifting out of the pulverulent distillation residue takes place in the lower part 25 of the hopper, where a system of horizontal, parallel sparger tubes 26 are installed, through which a sifting medium is introduced into the material and is uniformly distributed over the sifter cross-section. This medium is fed to the sparger tubes through the manifold tube 27. Underneath the hopper, in the pipe that carries the cleaned heat carrier to the distillation reactor, there is provided an additional system of spargers through which steam, for example, is introduced into the material, for the purpose of sweeping or displacing the sifting medium (e.g. air) from the interstitial areas.

Figure 4:
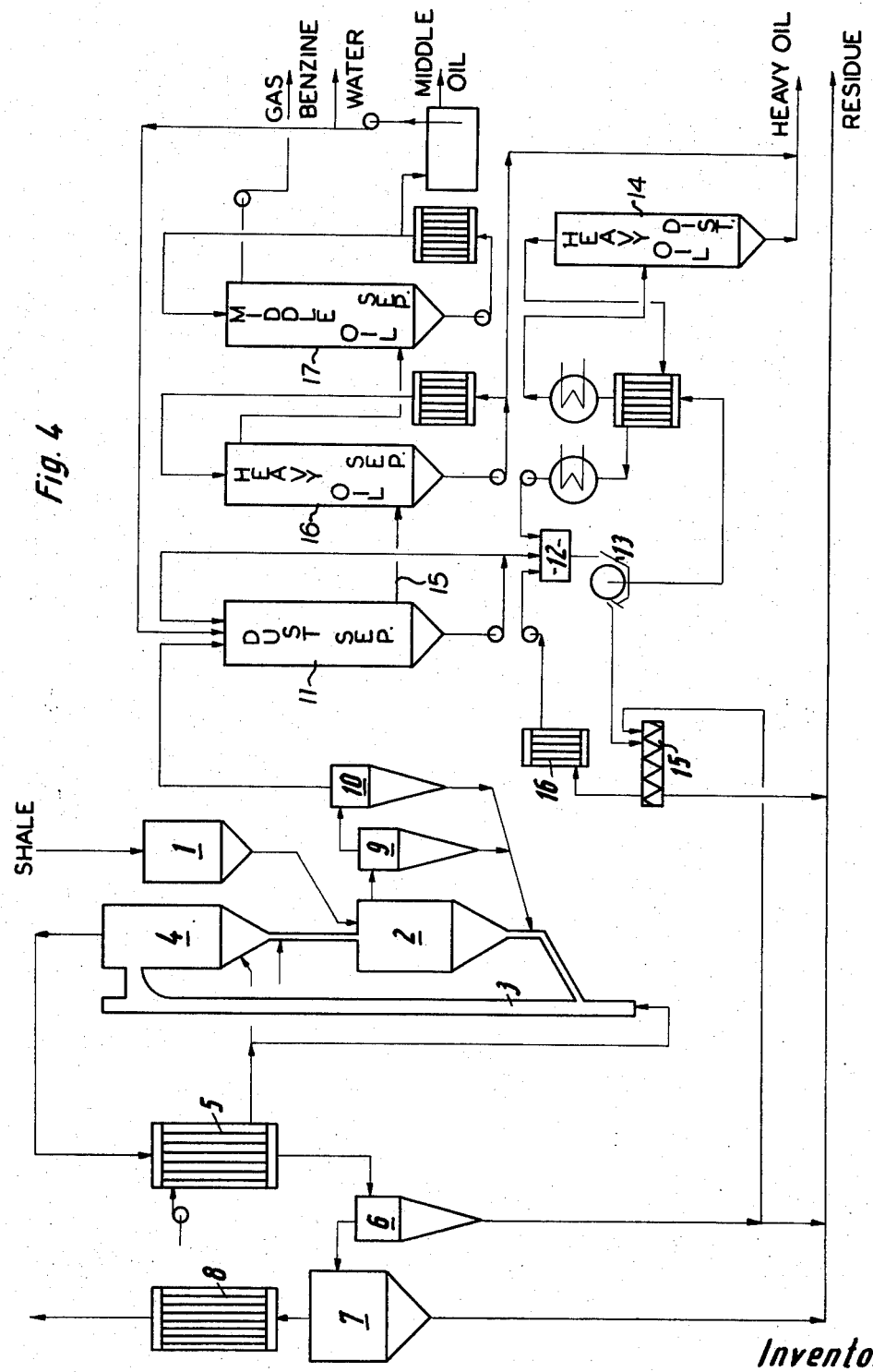
FIG. 4 is a flow diagram of the process with single-stage sifting (in a cyclone separator according to FIG. 3), filtration of the heavy oil after dilution, recovery of the diluent by distillation and drying of the filter cake by mixing it with hot distillation residue.

Another possible mode of construction of the separator and sifter is represented schematically in FIG. 3. In this case a cyclone separator is used. The mixture of solids and gases coming from the pneumatic lift enters the cyclone 33 tangentially through the inlet passage 32. The solids are substantially separated and collect in the lower portion 34. The propellant gas leaves the cyclone through the pipe 35. In the tapering bottom portion a sifting medium (e.g. air) is injected through the sparger system 36. At a distance of at least 250 mm. below that, sweeping or stripping steam or a stripping gas is introduced through the spargers 36a. The dimensions of the bottom portion 34 are such that the accumulation of heat carrier and distillation residue that forms in it is put into a fluid state by the upwardly flowing sifting medium. In order that the fluidization may be as uniform as possible, the bottom portion 34 flares from the bottom up in the manner of a diffuser. The pulverulent distillation residue carried up out of the fluidized bed by the sifting medium is carried out together with the propellant gas through the discharge pipe 35. This design of the separator-shifter is the basis of the flow diagram in FIG. 4, which is the subject of Example 2.

EXAMPLE 2

1 again designates the shale feeding hopper, provision (not shown) being made for the admixture, with shale as is used in Example 1, of 1.5% of an oil-poor shale which has less of a tendency to grain disintegration in the low-temperature distillation process. In this embodiment, the heat carrier is distilled oil-poor shale and the said 1.5% is make-up heat carrier. In the present variant, no mechanical mixer is used, i.e., the starting material and heat carrier are fed into the low-temperature distillation reactor 2 at the top in such a manner that they are well mixed together. This method of construction is preferred in installations of medium and small throughput. The solids elevated and heated in the pneumatic lift 3 are separated from the propellant gas in a cyclone 4 as is shown in FIG. 3. In the lower part of cyclone 4, a grateless fluidized bed is maintained by the introduction of preheated air, the heating of the heat carrier being continued and the pulverulent distillation residue being separated from the heat carrier in the said fluidized bed. The dust-laden sifting gases leave the separator together with the propellant gases, pass through the air preheater 5 and are then cleaned of dust in two stages 6 and 7, separator 6 being a cyclone separator, and separator 7 being an electrostatic separator.

The electrical resistance of the dust, which varies with temperature, is in a desirable range at this relatively high temperature, and at very low temperatures as well, whereas at temperatures in between it passes through a maximum which is unfavorable to electrostatic dust removal. The cleaned gases are finally further cooled in the waste-heat boiler 8 before they are fed to the smokestack.

The distillation gases and vapors, after dust is removed in the cyclones 9 and 10, are subjected to a treatment for removal of further dust in the dust separator 11, wherein some condensation of heavy oil occurs, and the heavy oil scrubs the gas removing the dust. Then the distillation gases pass via line 15 to heavy oil separator 16, and from the latter to middle oil separator 17, these separations being carried out as is indicated in the flow diagram.

The dust-laden heavy oil that is produced in the dust separator 11 is mixed in mixer 12, in a ratio of 1:1 by weight, with light oil to thin it. The suspension is then filtered on the continuous revolving suction filter 13. The filtrate, after heating and the partial evaporation of the easily boiling fractions, is separated in heavy oil distillation column 14 into heavy oil and light oil. The heavy oil is taken out as a product, and the light oil is pumped, after condensation, back into the mixer 12 to serve as the light oil diluent. The filter cake is mixed with hot distillation residue from cyclone separator 6 in the mixer 15 and heated to dry it. The benzine that evaporates is liquefied in the condenser 16 and is passed to mixer 12 to serve as diluent. Desirably a high performance separator (not shown) can be installed between the mixer 15 and condenser 16 to separate solids entrained by the vapor. The dried filter cake, composed of distillation residue and rock sand purge is discharged from the process.

EXAMPLE 3

Figure 5:
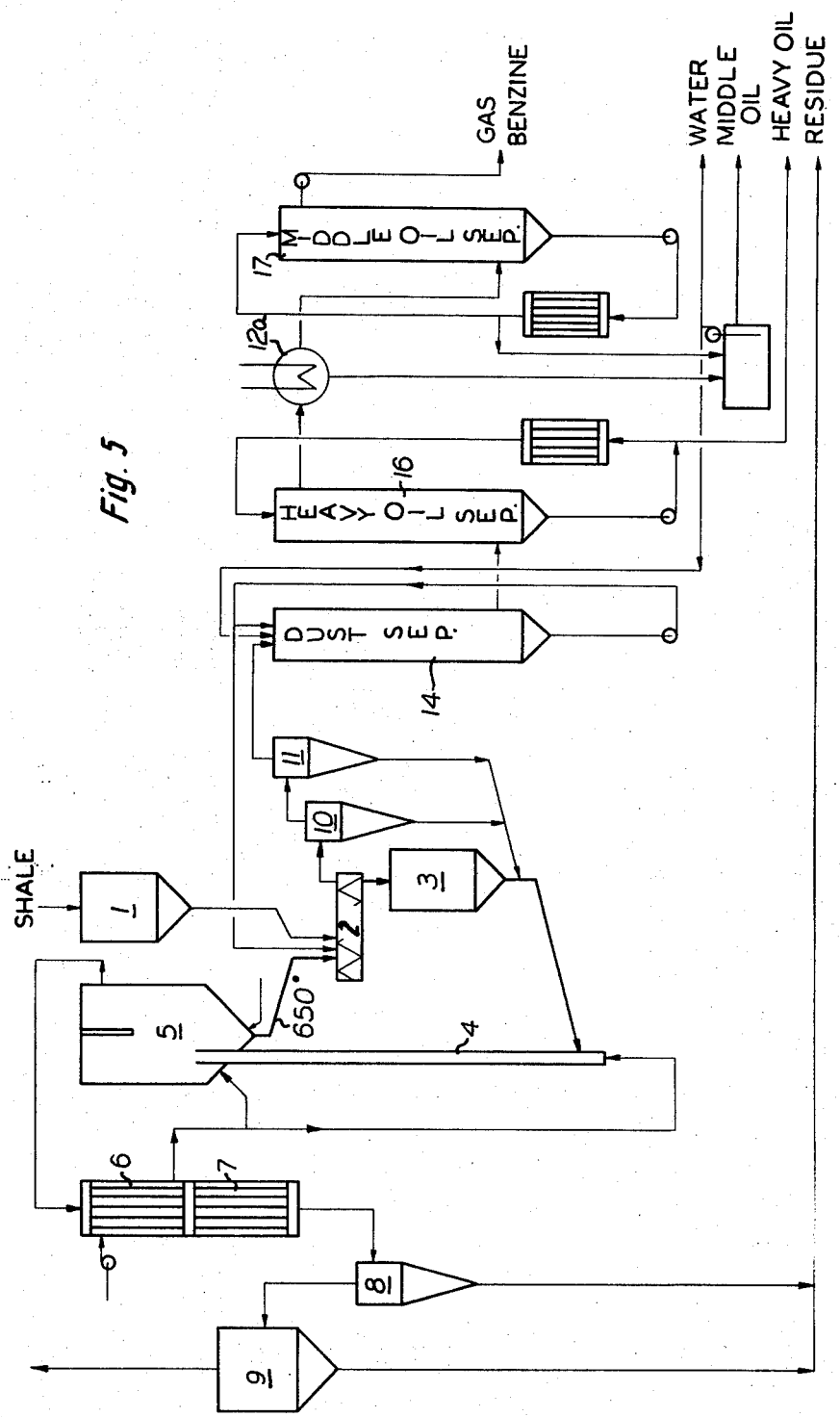
FIG. 5 is a flow diagram of the process with two-stage sifting and feedback of heavy oil to the distillation reactor.

Another variant is represented diagrammatically in FIG. 5. It differs from the embodiment described in Example 1 particularly in that the dust-laden heavy oil produced in the heavy oil dust separator 14 (FIG. 5) is returned, without treatment, for redistillation in the distillation reactor 2. In this application, a mechanical mixer serving as the distillation reactor offers special advantages, because it prevents the formation of larger agglomerates interfering with the circulation of the heat carrier, such as might be caused by the carbon that develops in the partial cracking of the recycled heavy oil, causing the very fine dust contained in the heavy oil to coalesce into somewhat larger particles. Any of these particles that do not leave the mixer together with the heat carriers, but emerge from the mixer with the distillation gases and vapors instead, are substantially separated upon passage through the cyclones 10 and 11 provided between the mixer and condensation system.

In the present example, the mixer or distillation reactor 2 is of a greater length than it would be in the case of a system without heavy oil recycling (e.g. FIG. 1), being elongated by the amount that is required for the redistillation of the heavy oil. In the case of a large, slowly running mixer, the amount of elongation can be shorter than the diameter of the mixing screws, but in small mixers running at greater speeds it requires up to three times the amount of the screw diameter.

The redistillation of the heavy oil is performed in the hottest part of the mixer, in order to bring about a partial cracking of the heavy oil, without having to increase the distillation temperature above the optimum level of 530° C. Accordingly, the heat carrier at a temperature of 650° C. is first mixed with the recycled heavy oil, whereupon it is cooled to 630° C. Not until then does it come in contact with the material being distilled, whereupon an equilibrium temperature of 530° C. is established.

What is claimed is:

1. In a process for the distillation of finely divided bituminous or petroliferous raw materials in a distillation zone with hot inert heat carrier material, the distillation of the raw material forming a pulverulent solid distillation residue, said pulverulent solid distillation residue having a particulate mass less than the mass of the heat carrier material, withdrawing from said distillation zone as a top product volatile distillation product and as a bottom product a mixture of said heat carrier material and solid distillation residue, passing said mixture of heat carrier material and solid distillation residue to a heating zone, pneumatically conveying said mixture with air as a propellant gas through said heating zone to a separation chamber, in said heating zone burning off any carbonaceous material from said solid distillation residue and sifting burnt pulverulent distillation residue from the heat carrier, in said separating chamber separating propellant gas and entrained solid distillation residue from said hot heat carrier material, withdrawing said hot heat carrier material from said separation chamber and introducing the withdrawn heat carrier to said distillation zone for admixture with further raw material, the improvement which comprises sifting the hot, separated heat carrier material with a sifting gas before returning the hot heat carrier to the distillation zone, to remove pulverulent distillation residue from the separated hot heat carrier material, cooling said mixture of the spent propellant gas and the burnt pulverulent distillation residue in an indirect heat exchange with cold air, thereafter separating said burnt pulverulent distillation residue from said spent propellant gas and using the air heated in said indirect heat exchange as said propellant gas.

2. Process according to claim 1, wherein said sifting gas is air effecting after burning of combustible substances and wherein after sifting with the sifting gas the remaining hot heat carrier material before returning to the distillation zone is stripped with an inert gas.

3. Process according to claim 1, wherein said heat carrier consists essentially of sand, ceramic or sand and ceramic particles of size up to 2 mm.

4. Process according to claim 1, wherein the separation of spent propellant gas and burnt pulverulent distillation residue is effected in two stages the first stage being a mechanical separation, and the second stage being an electrostatic separation, and wherein intermediate these two stages the propellant gas is cooled by injection and evaporation of water, thereby being rendered more amenable to electrostatic separation.

5. Process according to claim 1, wherein the distillation gases from the distillation zone are subjected to fractional condensation to produce at least a heavy oil fraction containing substantially all pulverulent distillation residue carried from the distillation zone by the volatile distillation product.

6. A process according to claim 5, wherein said heavy oil fraction containing pulverulent distillation residue is returned to said distillation zone for redistillation and partial cracking.

7. Process according to claim 5, wherein said heavy oil fraction laden with pulverulent distillation residue is separated by centrifugation at a temperature of about 100–350° C., the separated pulverulent distillation residue being returned to said distillation zone.

8. Process according to claim 7, wherein the pulverulent distillation residue separated from the heavy oil fraction is combined with said raw material and the resulting mixture is introduced into the distillation zone.

9. Process according to claim 5, wherein said heavy oil fraction containing pulverulent distillation residue is diluted with light oil, separating by filtration the diluted mixture to provide a separated pulverulent distillation residue with retained light oil, separating retained light oil by distillation from said pulverulent distillation residue, and utilizing the separated light oil in said dilution.

10. Process according to claim 9, wherein said distillation is effected by mixing said residue with retained light oil and hot pulverulent distillation residue from effluent of the heating zone, the light oil evaporated being condensed and returned to said dilution.

References Cited

UNITED STATES PATENTS

| | | | |
|---|---|---|---|
| 3,251,751 | 5/1966 | Lindahl et al. | 201—20 X |
| 3,140,240 | 7/1964 | Fowler | 201—31 |
| 2,983,653 | 5/1961 | Danulat et al. | 201—33 |
| 3,562,783 | 2/1971 | Gorin | 201—33 X |
| 2,982,701 | 5/1961 | Scott | 201—27 |
| 3,505,201 | 4/1970 | Hodgson et al. | 201—23 |
| 2,788,314 | 4/1957 | Schmalfeld et al. | 201—31 X |
| 3,281,349 | 10/1966 | Evans | 208—11 |
| 3,535,209 | 10/1970 | Ledent | 201—31 |
| 3,501,394 | 3/1970 | Lyons | 208—11 |
| 3,597,347 | 8/1971 | Ellington | 201—12 |

WILBUR L. BASCOMB, JR., Primary Examiner

D. EDWARDS, Assistant Examiner

U.S. Cl. X.R.

201—20, 33; 208—11